(12) United States Patent
Ochi et al.

(10) Patent No.: US 7,678,433 B2
(45) Date of Patent: Mar. 16, 2010

(54) SEALANT FOR LIQUID CRYSTAL AND LIQUID-CRYSTAL DISPLAY CELL MADE WITH THE SAME

(75) Inventors: Naoyuki Ochi, Saitama (JP); Toyofumi Asano, Saitama (JP); Masahiro Imaizumi, Kita-ku (JP); Masaru Kudo, Saitama (JP); Eiichi Nishihara, Kita-ku (JP); Hiroo Koyanagi, Itabashi-ku (JP); Sumio Ichimura, Kita-ku (JP); Masahiro Hirano, Ageo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 313 days.

(21) Appl. No.: 10/555,898

(22) PCT Filed: May 18, 2004

(86) PCT No.: PCT/JP2004/006646

§ 371 (c)(1),
(2), (4) Date: Dec. 23, 2005

(87) PCT Pub. No.: WO2004/104683

PCT Pub. Date: Dec. 2, 2004

(65) Prior Publication Data

US 2007/0020405 A1       Jan. 25, 2007

(30) Foreign Application Priority Data

May 21, 2003    (JP)    .............................. 2003-142805
Jun. 5, 2003     (JP)    .............................. 2003-160513

(51) Int. Cl.
     *G02F 1/1339*    (2006.01)
(52) U.S. Cl. ................. 428/1.5; 428/1.53; 428/1.54; 428/355 EP; 428/355 AC; 349/122; 349/153
(58) Field of Classification Search ............... 428/1.1, 428/1.53–1.54, 355 EP, 355 AC, 1.5; 252/299.01, 252/299.5; 349/122, 153; 525/530
     See application file for complete search history.

(56) References Cited

U.S. PATENT DOCUMENTS

| | | | | |
|---|---|---|---|---|
| 2,965,610 | A * | 12/1960 | Newey ........................ | 528/115 |
| 3,144,421 | A * | 8/1964 | Yost ............................ | 523/456 |
| 3,294,748 | A * | 12/1966 | Rogers, Jr. et. al. ......... | 528/120 |
| 3,450,613 | A * | 6/1969 | Steinberg ...................... | 522/37 |
| 3,840,448 | A * | 10/1974 | Osborn et al. .................. | 522/4 |
| 3,853,962 | A * | 12/1974 | Gander ........................ | 560/221 |
| 3,901,833 | A * | 8/1975 | Flynn ......................... | 528/406 |
| 4,133,780 | A * | 1/1979 | Moore et al. ................ | 521/167 |
| 4,252,592 | A * | 2/1981 | Green ..................... | 156/273.3 |
| 4,297,401 | A * | 10/1981 | Chern et al. ............... | 428/1.53 |
| 4,526,940 | A * | 7/1985 | Seymour et al. ............ | 525/526 |
| 5,596,023 | A * | 1/1997 | Tsubota et al. .............. | 522/100 |
| 5,889,076 | A | 3/1999 | Dones et al. ................ | 522/143 |
| 6,156,816 | A * | 12/2000 | Saint Victor ................. | 522/96 |
| 6,555,187 | B1 * | 4/2003 | Kitamura .................... | 428/1.53 |
| 6,656,979 | B1 * | 12/2003 | Kitano et al. ................ | 522/100 |
| 6,673,441 | B1 * | 1/2004 | Tanaka et al. .......... | 428/355 EP |
| 7,534,909 | B2 * | 5/2009 | Otsuji et al. ................. | 560/225 |
| 2001/0031835 | A1 * | 10/2001 | Ohrui et al. ............... | 525/329.7 |
| 2002/0117259 | A1 * | 8/2002 | Giroux et al. ............... | 156/330 |
| 2002/0146559 | A1 * | 10/2002 | Touhsaent .................... | 428/341 |
| 2002/0176046 | A1 * | 11/2002 | Kitamura et al. ............ | 349/153 |
| 2003/0147034 | A1 * | 8/2003 | Kojima ....................... | 349/153 |
| 2006/0006362 | A1 * | 1/2006 | Miyawaki et al. ....... | 252/299.01 |

FOREIGN PATENT DOCUMENTS

| | | |
|---|---|---|
| EP | 0 646 632 | 4/1995 |
| JP | 59 137929 | 8/1984 |
| JP | 62 089930 | 4/1987 |

(Continued)

OTHER PUBLICATIONS

European communication dated Aug. 2, 2006.

(Continued)

*Primary Examiner*—Sophie Hon
(74) *Attorney, Agent, or Firm*—Nields, Lemack & Frame, LLC

(57) ABSTRACT

An objective of this application is to provide a sealant for liquid crystals witch is extremely less apt to contaminate liquid crystals and has high adhesion strength. This application discloses a sealant for liquid crystals comprising as essential ingredients (a) a radiation-curable resin represented by the general formula (1):

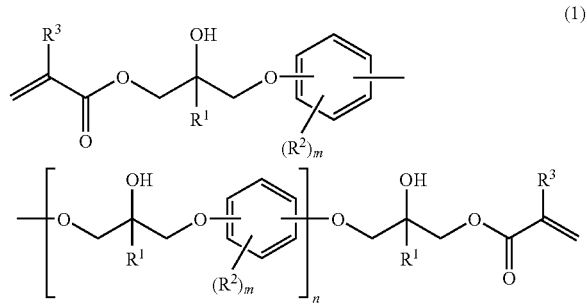

wherein $R^1$ represents a hydrogen atom or a methyl group, $R^2$ represents a hydrogen atom, a halogen atom, a hydroxyl group, a linear, branch or cyclic monovalent alkyl group having 1 to 10 carbon atoms, or an alkoxy group having 1 to 10 carbon atoms, m represents an integer of 1 to 4, and may be the same or different, $R^3$ represents a hydrogen atom or a methyl group, and the number n of the repeating units is a positive number in the range of 0 to 20; (b) a photopolymerization initiator; and (c) an inorganic filler having an average particle diameter of 3 μm or less.

11 Claims, No Drawings

FOREIGN PATENT DOCUMENTS

| | | |
|---|---|---|
| JP | 63-179323 | 7/1988 |
| JP | 2-223954 | 9/1990 |
| JP | 5 279 451 | 10/1993 |
| JP | 5-262850 | 10/1993 |
| JP | 5-279451 | 10/1993 |
| JP | 9 005 759 | 1/1997 |
| JP | 9 286 078 | 11/1997 |
| JP | 9-286078 | 11/1997 |
| JP | 9 311340 | 12/1997 |
| JP | 10-239694 | 9/1998 |
| JP | 3162179 | 2/2001 |
| JP | 2001-133794 | 5/2001 |
| JP | 2001-152109 | 6/2001 |
| JP | 2001-311953 | 11/2001 |
| JP | 2002 88228 | 3/2002 |
| JP | 2002 129127 | 5/2002 |
| WO | WO 02/092718 A1 * | 11/2002 |

OTHER PUBLICATIONS

Lakokras Mater lkh Primen 1989, No. 6, pp. 46 to 48, full text- cited in Search Report.
Khimicheskaya Promyshlennost (Moscow), 1994, No. 2, pp. 89 to 91—cited in Search Report.
Plast. Massi, 1990, No. 4, p. 19-22; Neroznik et al.; "Synthesis and properties of epoxyacrylate based on resorcinol diglycidyl ether", with partial English translation.
European communication dated Jul. 26, 2007.
Lakokras Mater lkh Primen 1989, No. 6, pp. 46 to 48, full text—cited in Search Report.
Khimicheskaya Promyshlennost (Moscow), 1994, No. 2, pp. 89 to 91—cited in Search Report.
International Search Report dated Aug. 31, 2004.
The European Communication dated Jan. 18, 2007.
The Supplemental European Search Report dated May 9, 2006.
The European communication dated Mar. 3, 2008.
European communication dated Nov. 17, 2008.

* cited by examiner

SEALANT FOR LIQUID CRYSTAL AND LIQUID-CRYSTAL DISPLAY CELL MADE WITH THE SAME

This application is a 371 of PCT/JP04/06646 filed May 18, 2004.

TECHNICAL FIELD

The present invention relates to a sealant for liquid crystals and a liquid crystal display cell made with the same. More specifically, the present invention relates to a sealant for liquid crystals which can be used for the production of a liquid crystal display cell by dropping liquid crystals inside the photo-and-heat-curing type sealant for liquid crystals formed on a substrate, attaching another substrate thereto and curing this sealant for liquid crystals thereby sealing the liquid crystals, and a liquid crystal display cell made with the same.

BACKGROUND ART

With the increase in the size of a liquid crystal display cell in recent years, so-called liquid crystal dropping method has been proposed as a process for producing a liquid crystal display cell higher in mass productivity (see Japanese Patent Application Laid-open Nos. 63-179323 and 10-239694). Specifically, it is a process for producing a liquid crystal display cell comprising dropping liquid crystals inside a sealant for liquid crystals formed on a substrate and then attaching another substrate thereto thereby sealing the liquid crystals.

However, the liquid crystal dropping method has a problem that a sealant for liquid crystals in an uncured state contacts the liquid crystal at first and at that time the ingredients of the sealant for liquid crystals dissolve in the liquid crystals, which causes defect of reducing the specific resistance of the liquid crystal and therefore the method has not been fully spread as a mass-production method of liquid crystal display cell.

There have been contemplated three methods in the liquid crystal dropping method, i.e., a heat-curing method, a photo-curing method and a photo-and-heat-curing method as a method for curing a sealant for liquid crystals after attaching the substrates together. The heat-curing method has problems that the liquid crystals expanded by heating leak out of the sealant for liquid crystals which is lowered in viscosity in the middle of curing and that ingredients of the sealant for liquid crystals which is lowered in viscosity dissolve in the liquid crystals, and these problems are difficult to solve. Therefore, the heat-curing method is not yet put in practical use.

On the other hand, the sealant for liquid crystals used for the photo-curing method includes two types, cationic polymerization type and radical polymerization type depending on the type of photopolymerization initiator. As for the cationic polymerization type sealant for liquid crystals, there is a problem that ions are generated at the time of photo-curing and when it is used in the liquid crystal dropping method, the ionic ingredients elute in the liquid crystals in contact therewith and decreases the specific resistance of the liquid crystals. In addition, since the curing contraction of the radical polymerization type sealant for liquid crystals at the time of photo-curing is large, there is a problem that adhesion strength is not sufficient. Furthermore, as a problem common in the photo-curing methods of both the cationic polymerization type and the radical polymerization type, there is a problem that shaded parts which are not irradiated with light are resulted in the sealant for liquid crystals due to metal wiring of the array substrate of liquid crystal display cell or black matrix of color filter substrate and such shaded parts remain uncured.

In this way, various problems are involved in the heat-curing method and the photo-curing method, and actually photo-and-heat-curing method is considered to be the most practical method. The photo-and-heat-curing method is characterized in that after the sealant for liquid crystals placed between the substrates is irradiated with light to perform primary curing, it is heated to perform secondary curing. As properties required of the sealant for liquid crystals used for the photo-and-heat-curing method, it is important that the sealant for liquid crystals does not contaminate the liquid crystals in each step before and after the light irradiation and before and after the heat curing. Particularly needed are measures to deal with the problem by shaded parts described above, i.e., measures to deal with the elution of the ingredients of the sealant into the liquid crystals at the time of heat-curing from the parts which are not photo-cured. As a solution therefor, there may be considered (i) an approach in which rapid curing is performed at a low temperature before the ingredients of the sealant elute, or (ii) an approach to constitute the sealant with ingredients which hardly elute into the liquid crystal composition, and so on. Naturally, however, rapid curing at a low temperature concurrently means that the pot life at the time of use is deteriorated, and poses a practically large problem. Therefore, in order to attain a sealant for liquid crystals having a long pot life and achieving low contamination of liquid crystal, it is necessary to constitute the sealant with ingredients which hardly elute into the liquid crystal composition. However, since epoxy resins generally known well, for example, bisphenol A epoxy resin and bisphenol F epoxy resin have good compatibility with liquid crystal, it is hard to say that they are suitable as ingredients of a sealant composition from a viewpoint of contaminating properties.

Japanese Patent Application Laid-open No.2001-133794 proposes to use a partially (meta)acrylated bisphenol A type epoxy resin described in Japanese Patent Application Laid-open No.5-295087 as the main resin ingredient for a sealant for liquid crystals for dropping method (see Japanese Patent Application Laid-open Nos. 2001-133794 and No. 5-295087). However, the solubility to the liquid crystal is reduced but unsatisfactorily by (meta)acrylation, and it is also difficult to solve the problem that the unreacted and remained epoxy resin material contaminates the liquid crystal.

As explained above, photo-and-heat-curing type sealant for liquid crystals for a liquid crystal dropping method conventionally proposed are not satisfactory in all of the properties such as liquid crystal contaminating properties, adhesion strength, usable life at room temperature, and low-temperature curing properties.

DISCLOSURE OF THE INVENTION

Problems to be Solved by the Invention

As explained above, partially acrylated substance of bisphenol type epoxy resin is mainly used at present for a sealant for liquid crystals dropping method. However, the partially acrylated substance of bisphenol type epoxy resin has a problem that it is likely to elute when in contact with a liquid crystal or when heated in contact with a liquid crystal, which causes poor orientation of the liquid crystal and display irregularities, and reduces reliability of a panel.

On the other hand, totally acrylated substance of bisphenol type epoxy resin is relatively hard to elute into the liquid crystal, but it is not necessarily enough. Moreover, since the viscosity was high, there was also a problem that the other ingredients which could be used were greatly limited when it was used as a sealant for liquid crystals composition.

The present invention relates to a sealant for liquid crystals which can be used for liquid crystal dropping method for the production of a liquid crystal display cell by dropping liquid crystals inside the sealant for liquid crystals formed on a substrate, attaching another substrate thereto, irradiating the liquid crystal sealing parts followed by heat curing and the present invention proposes a sealant for liquid crystals which is extremely less apt to contaminate the liquid crystal through the process and further the ingredients of which scarcely elute into the liquid crystal even at shaded parts and which are excellent in application workability onto the substrate, attaching properties, adhesion strength and low-temperature curability.

Means to Solve the Problems

The present inventors have conducted intensive studies for solving the above mentioned problems and consequently completed the present invention. The radiation curable resin of the present invention has very low compatibility with the liquid crystal composition, and the sealant for liquid crystals made with the same is extremely less apt to contaminate the liquid crystals. Moreover, since the radiation curable resin used in the present invention has low viscosity, it imposes small restrictions on the other ingredients which can be used when the resin is made into a sealant for liquid crystals composition and enables to use together a resin having a higher viscosity and enables to be filled with more filler.

That is, the present invention relates to the following:

(1) A sealant for liquid crystals comprising as essential ingredients (a) a radiation curable resin represented by the general formula (1):

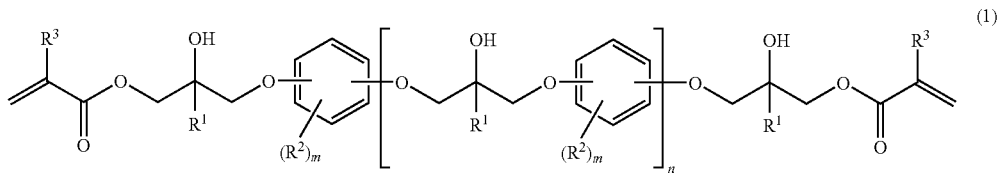

wherein $R^1$ represents a hydrogen atom or a methyl group, $R^2$ represents a hydrogen atom, a halogen atom, a hydroxyl group, a linear, branch or cyclic monovalent alkyl group having 1 to 10 carbon atoms, or an alkoxy group having 1 to 10 carbon atoms, m represents an integer of 1 to 4, and may be the same or different, $R^3$ represents a hydrogen atom or a methyl group, and the number n of the repeating units is a positive number in the range of 0 to 20; (b) a photopolymerization initiator; and (c) an inorganic filler having an average particle diameter of 3 μm or less, (2) The sealant for liquid crystals according to (1), wherein the radiation curable resin (a) is a radiation curable resin represented by the general formula (2):

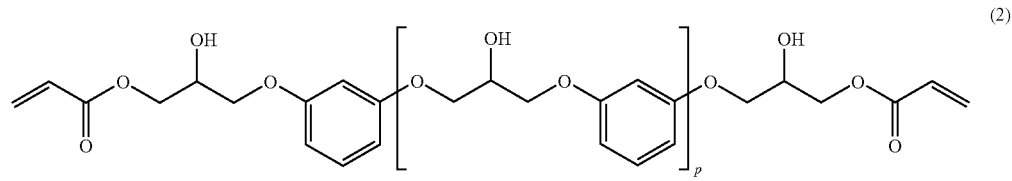

wherein the number p of the repeating units is a positive number in the range of 0 to 20, (3) The sealant for liquid crystals according to (1) or (2), wherein the radiation curable resin (a) has a content of 30% by weight to 80% by weight based on the total sealant for liquid crystals, (4) The sealant for liquid crystals according to any one of (1) to (3), wherein the radiation curable resin (a) has a viscosity of 30 to 500 Pa·S, (5) The sealant for liquid crystals according to any one of (1) to (4), wherein the photopolymerization initiator (b) is a radical type photopolymerization initiator, (6) The sealant for liquid crystals according to (5), wherein the radical type photopolymerization initiator (b) is a carbazole initiator, (7) The sealant for liquid crystals according to any one of (1) to (6), further comprising (d) an epoxy resin and (e) a heat-curing agent, (8) The sealant for liquid crystals according to (7), wherein the epoxy resin (d) is an epoxy resin which does not elute into the liquid crystals in an amount of 0.5% by weight or more based on the liquid crystals when the epoxy resin is brought directly into contact with the liquid crystals whose amount is 10 times of the epoxy resin and is allowed to stand at 120° C. for 1 hour, (9) The sealant for liquid crystals according to (7) or (8), wherein the heat-curing agent (e) is a dihydrazide,

(10) The sealant for liquid crystals according to (9), wherein the dihydrazide is a dihydrazide having a skeleton of isophthalic dihydrazide and/or valine hydantoin,

(11) The sealant for liquid crystals according to (7) or (8), wherein the heat-curing agent (e) is a polyhydric phenol,

(12) The sealant for liquid crystals according to any one of (1) to (11) further comprising (f) a silane coupling agent,

(13) The sealant for liquid crystals according to (12), wherein the silane coupling agent is a silane coupling agent having an amino group,

(14) A liquid crystal display cell which is sealed with a cured product of a sealant for liquid crystals according to any one of (1) to (13), and

(15) A process for producing a liquid crystal display cell comprising dropping liquid crystals inside a sealant for liquid crystals according to any one of (1) to (13) formed on a substrate and attaching another substrate thereto.

Effects of the Invention

According to the present invention, a sealant for liquid crystals excellent in strong adhesion strength and low liquid crystal contamination has been enabled to be obtained. Moreover, production of liquid crystal display cell excellent in reliability has been enabled to be attained by using the sealant for liquid crystals of the present invention in a liquid crystal dropping method.

BEST MODE FOR CARRYING OUT THE INVENTION

The present invention is described in detail below.

The sealant for liquid crystals of the present invention is characterized by containing (a) a radiation curable resin represented by the general formula (1), (b) a photopolymerization initiator and (c) an inorganic filler having an average particle diameter of 3 μm or less as essential components.

In the radiation curable resin (a) represented by the general formula (1), $R^1$ represents a hydrogen atom or a methyl group, and preferably it is a hydrogen atom. $R^2$ represents a hydrogen atom, a halogen atom, a hydroxyl group, a linear, branch or cyclic monovalent alkyl group having 1 to 10 carbon atoms, or an alkoxy group having 1 to 10 carbon atoms, and preferably it is a hydrogen atom. $R^3$ represents a hydrogen atom or a methyl group, and preferably it is a hydrogen atom. The number m represents an integer of 1 to 4, and m may be the same or different. The number n of the repeating units is a positive number in the range of 0 to 20, and preferably it is a positive number in the range of 0 to 1.5.

In the radiation curable resin (a) represented by the general formula (1), particularly preferred in the present invention is a radiation curable resin represented by the general formula (2), and p is a positive number in the range of 0 to 20, and preferably it is a positive number in the range of 0 to 1.5.

The radiation curable resin (a) used in the present invention can be obtained by subjecting resorcin diglycidyl ether, catechol diglycidyl ether, hydroquinone diglycidyl ether, etc. to esterification reaction with a (meta)acrylic acid in an amount equivalent to the epoxy group. This synthetic reaction can be performed by a commonly known method. For example, an equivalent amount of (meta)acrylic acid is added to resorcin diglycidyl ether together with a catalyst (for example, benzylmethylamine, triethylamine, benzyltrimethylammonium chloride, triphenylphosphine, triphenylstibine, etc.) and a polymerization inhibitor (for example, methoquinone, hydroquinone, methylhydroquinone, phenothiazine, dibutylhydroxytoluene, etc.), and esterification reaction is performed for example at 80 to 110° C. The thus obtained (meta)acrylated resorcin diglycidyl ether is a resin which has a radically polymerizable (meta)acryloyl group.

In addition, the radiation curable resin (a) used in the present invention can be obtained by reacting resorcin, catechol, hydroquinone, etc., with glycidyl (meta)acrylate which is equivalent or excessive to the OH-group thereof. This synthetic reaction can be performed by a commonly known method. For example, glycidyl (meta)acrylate equivalent to the OH-group of resorcin is added to the resorcin together with a catalyst (for example, benzylmetlhylamine, triethylamine, benzyltrimethylammonium chloride, triphenylphosphine, triphenylstibine, etc.) and a polymerization inhibitor (for example, methoquinone, hydroquinone, methylhydroquinone, phenothiazine, dibutylhydroxytoluene, etc.), and esterification reaction is performed at 80 to 110° C. The thus obtained (meta)acrylated resorcin diglycidyl ether is a resin which has a radically polymerizable (meta)acryloyl group.

Furthermore in the present invention, the content ratio of the radiation curable resin (a) to the sealant for liquid crystals is usually about 30% by weight to 80% by weight, preferably about 40% by weight to about 75% by weight to the weight of the whole sealant for liquid crystals. Moreover, the viscosity of radiation curable resin (a) is preferably about 30 to about 500 Pa·S.

As an photopolymerization initiator (b) used in the present invention, any kind of photopolymerization initiator such as a radical type initiator and a cation type initiator may be used, but it is preferably a radical type initiator from a viewpoint of liquid crystal contaminating properties. The radical initiator includes benzylmethylketal, 1-hydroxycyclohexyl phenyl ketone, diethylthioxanthone, benzophenone, 2-ethyl anthraquinone, 2-hydroxy 2-methylpropiophenone, 2-methyl-[4-(methylthio)phenyl]-2-morpholino-1-propane, 2,4,6-trimethylbenzoyldiphenylphosphine oxide etc., for example, and an initiator having a sensitivity near i line (365 nm) whose influence on the characteristics of liquid crystal is relatively small and a low liquid crystal contaminating properties is preferable. Specific examples of such an initiator include carbazole initiators such as 3,6-bis(2-methyl-2-morpholinopropionyl)-9-n-octylcarbazole.

In the sealant for liquid crystals of the present invention, the compounding ratio of the photopolymerization initiator (b) to the ingredient (a) is preferably 0.01 to 5 weight parts to 100 weight parts of the ingredient (a), particularly preferably 0.1 to 3 weight parts. If the photopolymerization initiator is less than 0.1 weight parts, photo-curing reaction is not sufficient, and if it increases more than 3 weight parts, there is too much quantity of the initiator and contamination by the initiator on the liquid crystal and deterioration of the curable resin properties may be caused.

Examples of the inorganic filler (c) used in the present invention include fused silica, crystal silica, silicon carbide, silicon nitride, boron nitride, calcium carbonate, magnesium carbonate, barium sulfate, calcium sulfate, mica, talc, clay, alumina, magnesium oxide, zirconium dioxide, aluminum hydroxide, magnesium hydroxide, calcium silicate, aluminum silicate, lithium aluminum silicate, zirconium silicate, barium titanate, glass fiber, carbon fiber, molybdenum disulfide, asbestos, etc., preferably it is fused silica, crystal silica, silicon nitride, boron nitride, calcium carbonate, barium sulfate, calcium sulfate, mica, talc, clay, alumina, aluminum hydroxide, calcium silicate, and aluminum silicate, and more preferably it is fused silica, crystal silica, alumina and talc. Two or more of these inorganic fillers may be mixed and used.

The average particle diameter of the inorganic filler used in the present invention is not more than 3 μm, and the minimum is on the order of 0.003 μm. If the average particle diameter is larger than 3 μm, gap cannot be suitably formed when the top and the bottom glass substrates are stuck together in the production of a liquid crystal cell. The average particle diameter of the inorganic filler was measured with a laser diffraction and dispersion type particle diameter distribution measuring instrument (dry type) (product of SEISHIN, Inc. Company; LMS-30).

The content ratio in the sealant for liquid crystals of the inorganic filler used in the present invention is usually 5 to 40% by weight, preferably 15 to 25% by weight. Since the adhesion strength to the glass substrate decreases and wet-proof reliability is also deteriorated when the content ratio of the inorganic filler is lower than 5% by weight, the adhesion strength after moisture absorption also tends to greatly decrease. When the content ratio of the inorganic filler is more than 40% by weight, the filler content is so much that the sealing is hard to be deformed, and there is a case where gap in the liquid crystal cell cannot be formed.

The sealant for liquid crystals of the present invention preferably contains an epoxy resin (d) in addition to the above-mentioned three essential components (a) to (c). The epoxy resin (d) used in the present invention is not limited, but an epoxy resin which does not elute into the liquid crystals in an amount of 0.5% by weight or more based on the epoxy resin when the epoxy resin is brought directly into contact with the liquid crystals whose amount is 10 times of the epoxy resin and is allowed to stand at 120° C. for 1 hour is preferable from the viewpoint of liquid crystal contaminating properties. Examples of such an epoxy resin include bisphenol S type epoxy resin represented by the formula (3):

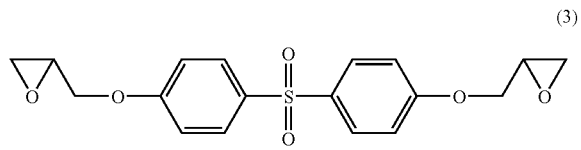

(3)

resorcin diglycidyl ether polymer represented by the formula (4):

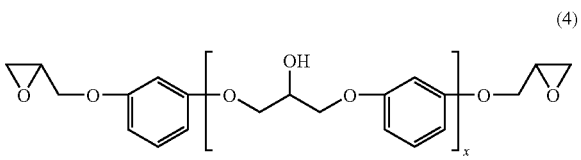

(4)

wherein x represents an integer of 1 to 10;

diglycidyl ether of the ethylene oxide addition bisphenol S represented by the formula (5):

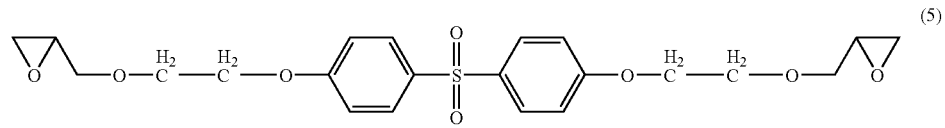

(5)

and diglycidyl ether of ethylene oxide addition bisphenol fluorene represented by the formula (6):

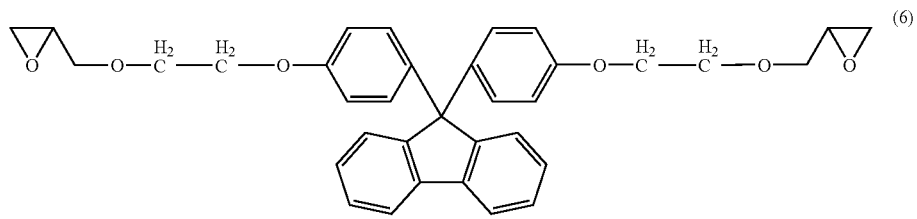

(6)

but it is not limited to these.

The quantification of the eluted substances can be conducted by gas chromatography using pentadecane as an internal standard.

The amount of hydrolyzed chlorine of the epoxy resin used in the present invention is preferably 600 ppm or less, and more preferably 300 ppm or less. If the amount of hydrolyzed chlorine increases more than 600 ppm, contaminating properties of the sealant for liquid crystals to liquid crystal may become a problem. The amount of hydrolyzed chlorine can be quantified by dissolving about 0.5 g of epoxy resin in 20 ml of dioxane and refluxing with 1N KOH/5 ml ethanol solution for 30 minutes, and titrating with 0.01N silver nitrate.

The content ratio of the epoxy resin (d) in the sealant for liquid crystals is usually about 1% by weight to about 40% by weight, preferably about 5% by weight to about 30% by weight to the whole sealant for liquid crystals.

The sealant for liquid crystals of the present invention preferably contains a heat-curing agent (e). Although the heat-curing agent is not particularly limited as long as it reacts with an epoxy resin (d) to form a cured product, it is important that the reaction starts promptly and uniformly when heated without contaminating the liquid crystal with a sealant for liquid crystals and there is little change in viscosity at the time of use at room temperature. In order to hold the deterioration of the properties of the sealed liquid crystal as little as possible, low-temperature curing ability of generally 120° C. for about 1 hour is required as heat curing conditions in the case of liquid crystal dropping method. It is particularly preferable in view of the above points to use multifunctional hydrazides and polyhydric phenols as a heat-curing ingredient in the sealant for liquid crystals of the present invention.

The multifunctional dihydrazides as used herein mean a dihydrazides having two or more hydrazide groups in a molecule and specific examples thereof include carbohydrazide, oxalic dihydrazide, malonic dihydrazide, succinic dihydrazide, adipic dihydrazide, adipic dihydrazide, pimelic dihydrazide, suberic dihydrazide, azelaic dihydrazide, sebacic dihydrazide, dodecanediodihydrazide, hexadecanediohydrazide, maleic dihydrazide, fumaric dihydrazide, diglycollic dihydrazide, tartaric dihydrazide, malic dihydrazide, isophthalic dihydrazide, terephthalic dihydrazide, 2,6-naphthoic dihydrazide, 4,4-bis-benzene dihydrazide, 1,4-naphthoic dihydrazide, 2,6- pyridine dihydrazide, 1,2,4-benzene trihydrazide, pyromellitic tetrahydrazide, 1,4,5,8-naphthoic tetrahydrazide, and dihydrazides having a valine hydantoin skeleton such as 1,3-bis(hydrazinocarbonoethyl)-5-isopropyl hydantoin, but it is not limited to these. In the case of using a multifunctional dihydrazide as a curing agent, it is preferable to make the particle diameter fine so that the particles disperse uniformly in order to use it as a latent curing agent. Among the multifunctional dihydrazides, dihydrazides are preferable, and particularly preferred are isophthalic dihydrazide and dihydrazides having valine hydantoin skeletons from a viewpoint of liquid crystal contaminating properties.

On the other hand, polyhydric phenols mean phenols having two or more hydroxyl groups in a molecule and specific examples thereof include bisphenol A, bisphenol F, bisphenol S, bisphenol E, phenol novolac, cresol novolac, trisphenol methane type novolac, biphenyl type novolac, naphthalene type novolac, etc., but it is not limited to these.

If the average particle diameter of the ingredient (e) is too large, there causes problems such as malfunction that gap cannot be suitably formed when the top and the bottom glass substrates are stuck together in the production of a liquid crystal cell with a narrow gap, and therefore the average particle diameter of the ingredient (e) is preferably 3 μm or less and more preferably 2 μm or less. Similarly, the maximum particle diameter is preferably 8 μm or less, and more preferably 5 μm or less. The particle diameter of a curing agent was measured with a laser diffraction and dispersion type particle diameter distribution measuring instrument (dry type) (product of SEISHIN, Inc. Company; LMS-30). It is preferable to perform production so that the average particle diameter may not be extremely small (for example, below 0.1 μm).

In the sealant for liquid crystals of the present invention, the compounding ratio of the ingredient (e) is preferably 0.8 to 1.5 equivalent and more preferably 0.9 to 1.2 equivalent to the amount of the epoxy group of the ingredient (d). If the amount of the ingredient (d) is less than 0.8 equivalent, heat-curing reaction is insufficient, and adhesive strength and glass transition temperature may become low. On the other hand, if the amount is more than 1.5 equivalent, the curing agent may remain, adhesive strength may decrease and the pot life may be deteriorated.

The sealant for liquid crystals of the present invention preferably contains a silane coupling agent (f) in order to raise adhesion strength. Examples of the silane coupling agent include silane coupling agents such as 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl)3-aminopropylmethyldimethoxysilane, N-(2-aminoethyl)3-aminopropyl methyltrimethoxysilane, 3-aminopropyl triethoxysilane, 3-mercaptopropyltrimethoxysilane, vinyltrimethoxysilane, N-(2-(vinylbenzylamino)ethyl)3-aminopropyltrimethoxysilane hydrochloride, 3-methacryloxypropyltrimethoxysilane, 3-chloropropylmethyldimethoxysilane and 3-chloropropyltrimethoxysilane. Two or more of these silane coupling agents may be mixed and used. Among these, the silane coupling agent in which the silane coupling agent has an amino group is preferable in order to obtain more good adhesion strength. By using a silane coupling agent, adhesion strength improves and the sealant for liquid crystals excellent in wetproof reliability is obtained.

The content ratio of the sealant for liquid crystals of the silane coupling agent (f) is usually about 0.01% by weight to about 5% by weight, preferably about 0.02% by weight to about 1% by weight to the total weight of the liquid crystal.

Additives such as an organic solvent, organic fillers, pigments, leveling agents, and defoaming agents can be further compounded in a sealant for liquid crystals of the present invention if needed.

In order to obtain the sealant for liquid crystals of the present invention, for example, first the ingredient (a), the ingredient (b), and the ingredient (d) and if needed further the ingredient (f) are dissolved and mixed. Subsequently, predetermined amounts of the ingredient (e) as a heat-curing agent, the ingredient (c) and, if needed, a defoaming agent, a leveling agent, an organic filler, etc. are added to this mixture, and the sealant for liquid crystals of the present invention can be produced by mixing uniformly with a well-known mixing equipment, for example, three-rolls, sand mill, ball mill, etc.

The liquid crystal display cell of the present invention comprises a pair of substrates oppositely positioned at a predetermined interval on which predetermined electrodes are formed and the circumference of which is sealed with a sealant for liquid crystals of the present invention, and liquid crystal is enclosed within the space. The kind of liquid crystal enclosed is not particularly limited. Here, the substrates consist of a combination at least one of which has light permeability and comprises glass, quartz, plastics, silicon, etc. As the production process, for example, a spacer (gap control material) such as glass fiber is added on the sealant for liquid crystals and the sealant for liquid crystals is applied on one of the pair of substrates with a dispenser etc., and the liquid crystal is dropped inside this sealant for liquid crystals, another glass substrate is laid thereon in vacuum, and a gap is formed. After gap formation, ultraviolet ray is irradiated on the sealed parts of the liquid crystal with an ultraviolet-ray irradiation equipment, and photo-curing is carried out. The amount of ultraviolet-rays irradiation is preferably 500 mJ/cm$^2$ to 6000 mJ/cm$^2$, more preferably 1000 mJ/cm$^2$ to 4000 mJ/cm$^2$. Then, the liquid crystal display cell of the present invention can be obtained by curing at 90 to 130° C. for 1 to 2 hours. The thus obtained liquid crystal display cell of the present invention has no display defect resulted from liquid crystal contamination and is excellent in adhesiveness and wetproof reliability. Examples of the spacer include glass fiber, silica bead, polymer bead, etc. Although the diameters differ according to the purpose, it is usually 2 to 8 μm, preferably 4 to 7 μm. The amount used is usually 0.1 to 4 weight parts, preferably 0.5 to 2 weight parts and more preferably 0.9 to 1.5 weight parts to 100 weight parts of the sealant for liquid crystals of the present invention.

EXAMPLES

The present invention is described in more detail below by way of examples.

Synthesis Example 1

Synthesis of epoxy acrylate of resorcin diglycidyl ether(epoxy acrylate A)

Resorcin diglycidyl ether resin was dissolved in toluene, dibutylhydroxytoluene was added thereto as a polymerization inhibitor, and the temperature was elevated to 60° C. Then, acrylic acid in an amount of 100% equivalent of the epoxy group was added, the temperature was further elevated to 80° C., trimethylammonium chloride which was a reaction catalyst was added thereto, and the mixture was stirred at 98° C. for about 50 hours. The obtained reaction liquid was washed with water, toluene was evaporated and the object epoxy acrylate of resorcin was obtained (Epoxy acrylate A).

Synthesis Example 2

Synthesis of epoxy acrylate of bisphenol F epoxy (epoxy acrylate B)

Bisphenol F epoxy resin (product of Nippon Kayaku Co., Ltd., RE-404P, epoxy equivalent: 160 g/eq, hydrolyzed amount: 30 ppm) was dissolved in toluene, dibutylhydroxytoluene was added thereto as a polymerization inhibitor, and the temperature was elevated to 60° C. Then, acrylic acid in an amount of 100% equivalent of the epoxy group was added, the temperature was further elevated to 80° C., trimethylammonium chloride which was a reaction catalyst was added thereto, and the mixture was stirred at 98° C. for about 50 hours. The obtained reaction liquid was washed with water, toluene was evaporated and the object epoxy acrylate of bisphenol F epoxy was obtained (Epoxy acrylate B).

Synthesis Example 3

Synthesis of 60% partial epoxy acrylate of bisphenol F epoxy (epoxy acrylate C)

Bisphenol F epoxy resin (product of Nippon Kayaku Co., Ltd., RE-404P, epoxy equivalent: 160 g/eq, hydrolyzed amount: 30 ppm) was dissolved in toluene, dibutylhydroxytoluene was added thereto as a polymerization inhibitor, and the temperature was elevated to 60° C. Then, acrylic acid in an amount of 60% equivalent of the epoxy group was added, the temperature was further elevated to 80° C., trimethylammonium chloride which was a reaction catalyst was added thereto, and the mixture was stirred at 98° C. for about 50 hours. The obtained reaction liquid was washed with water, toluene was evaporated and the object partial epoxy acrylate of bisphenol F epoxy was obtained (Epoxy acrylate C).

Experiment Example 1

Liquid Crystal Contaminating Properties Test (Only by Heat)

0.1 g each of epoxy acrylates A to C synthesized above was put into a sample tube, respectively, and a liquid crystal (product of Merck, MLC-6866-100) was added to allow the acrylate to contact directly, and the mixture was placed in a 120° C. oven for 1 hour, and after that it was left at room temperature for 0.5 hour. After only the liquid crystal was taken out, quantification of the ingredients which eluted to this liquid crystal was carried out by gas chromatography with pentadecane used as an internal standard. The quantity of eluted substances was shown by % by weight to liquid crystal in Table 1. Although tile epoxy acrylate of resorcin diglycidyl ether (epoxy acrylate A) is low in viscosity, elution was about ⅓ as compared with 100% epoxy acrylate of bisphenol F epoxy (epoxy acrylate B). Three types of eluted substances of the epoxy resin from 60% partial epoxy acrylate substance of bisphenol F epoxy (epoxy acrylate C), one in which the epoxy group of both ends were acrylated, a monoacrylated compound in which only one side was acrylated, and the starting materials were confirmed. Thus, elution of the epoxy acrylates of resorcin diglycidyl ether (epoxy acrylate A) is smaller than that of the other epoxy acrylates.

TABLE 1

| | Epoxy Acrylate A | Epoxy Acrylate B | Epoxy Acrylate C |
|---|---|---|---|
| Viscosity | 50 Pa · s | 150 Pa · s | 80 Pa · s |
| Quantification of Eluted Substances (GC-MS) | 0.11% | 0.37% | 1.0% |

Example 1

A resin liquid was obtained by heating and dissolving 80 weight parts of the epoxy acrylate A of Synthetic Example 1, 20 weight parts of EBPS-300 (product of Nippon Kayaku Co., Ltd., epoxy equivalent: 233 g/eq, bisphenol S type epoxy resin) as an epoxy resin, 1.8 weight parts of 3,6-bis(2-methyl-2-morpholinopropionyl)-9-n-octylcarbazole (product of Asahi Denka Kogyo, Adeka Optomer N-1414) as a radical generating type photopolymerization initiator, 1.2 weight parts of an aminosilane coupling agent (N-β(aminoethyl)γ-aminopropyltrimethoxysilane, product of Shin-etsu Silicone, KBM-603) at 90° C. After the mixture was allowed to cool to room temperature, 5 weight parts of isophthalic dihydrazide (product name: IDH-S; jet mill pulverized grade by Otsuka Chemistry Inc. further finely pulverized with a jet mill; melting point: 224° C., active hydrogen equivalent: 48.5 g/eq; average particle diameter: 1.7 μm; maximum particle diameter: 7 μm), 30 weight parts of alumina (product of C.I. Kasei, Inc., SPC-aluminum, average particle diameter: 1.0 μm) and 7 weight parts of core shell rubber particles: paraloid EXL-2655 (product of Kureha Chemical Industry Co., Ltd., core layer: cross-linked polybutadiene, shell layer: alkyl methacrylate-styrene copolymer, average particle diameter: 200 nm) were added and blended with 3 rolls and the sealant for liquid crystals of the present invention was obtained. The viscosity (25° C.) of the sealant for liquid crystals was 250 Pa·s (R-type viscometer (product of Toki Sangyo Co., Ltd.)).

Example 2

A resin liquid was obtained by heating and dissolving 80 weight parts of the epoxy acrylate A of Synthesis Example 1, 20 weight parts of EBPS-300 (product of Nippon Kayaku Co., Ltd., epoxy equivalent: 233 g/eq, bisphenol S type epoxy resin) as an epoxy resin, 1.8 weight parts of 3,6-bis(2-methyl-2-morpholinopropionyl)-9-n-octylcarbazole (product of Asahi Denka Kogyo, Adeka Optomer N-1414) as a radical generating type photopolymerization initiator, 1.2 weight parts of an aminosilane coupling agent (N-β(aminoethyl)γ-aminopropyltrimethoxysilane, product of Shin-etsu Silicone, KBM-603) at 90° C. After the mixture was allowed to cool to room temperature, 6.5 weight parts of Amicure-VDH(1,3-bis(hydrazinocarbonoethyl)-5-isopropyl hydantoin; product of Ajinomoto Fine Techno finely pulverized with a jet mill), 30 weight parts of alumina (product of C.I. Kasei, Inc., SPC-Al, average particle diameter: 1.0 μm) and 7 weight parts of core shell rubber particles: paraloid EXL-2655 (product of Kureha Chemical Industry Co., Ltd., core layer: cross-linked polybutadiene, shell layer: alkyl methlacrylate-styrene copolymer, average particle diameter: 200 nm) were added and blended with 3 rolls and the sealant for liquid crystals of the present invention was obtained. The viscosity (25° C.) of the sealant for liquid crystals was 350 Pa·s (R-type viscometer (product of Toki Sangyo Co., Ltd.)).

Comparative Example 1

A resin liquid was obtained by heating and dissolving 70 weight parts of the epoxy acrylate B of Synthesis Example 2, 20 weight parts of EBPS-300 (product of Nippon Kayaku Co., Ltd., epoxy equivalent: 233 g/eq, bisphenol S epoxy resin) as an epoxy resin, 10 weight parts of reaction product of dipentaerythritol caprolactone and acrylic acid (product of Nippon Kayaku Co., Ltd., DPCA-60, hexafunctional) as a reactive diluting agent, 1.8 weight parts of 3,6-bis(2-methyl-2-morpholinopropionyl)-9-n-octylcarbazole (product of Asahi Denka Kogyo, Adeka Optomer N-1414) as a radical generating type photopolymerization initiator, 1.2 weight parts of an aminosilane coupling agent (N-β(aminoethyl)γ-aminopropyltrimethoxysilane, product of Shin-etsu Silicone, KBM-603) at 90° C. After the mixture was allowed to cool to room temperature, 5 weight parts of isophthalic dihydrazide (product name: IDH-S; jet mill pulverized grade by Otsuka Chemistry Inc. further finely pulverized with a jet mill; melting point: 224° C., active hydrogen equivalent: 48.5 g/eq; average particle diameter: 1.7 μm; maximum particle diameter: 7 μm), 30 weight parts of alumina (product of C.I. Kasei, Inc., SPC-Al, average particle diameter: 1.0 μm) and 7 weight parts of core shell rubber particles: paraloid EXL-2655 (product of Kureha Chemical Industry Co., Ltd., core layer: cross-linked polybutadiene, shell layer: alkyl methacrylate-styrene copolymer, average particle diameter: 200 nm) were added and blended with 3 rolls and the sealant for liquid crystals of the present invention was obtained. The viscosity (25° C.) of the sealant for liquid crystals was 400 Pa·s (R-type viscometer (product of Toki Sangyo Co., Ltd.)).

Comparative Example 2

A resin liquid was obtained by heating and dissolving 100 weight parts of the epoxy acrylate C of Synthesis Example 3, 1.8 weight parts of 3,6-bis(2-methyl-2-morpholinopropionyl)-9-n-octylcarbazole (product of Asahi Denka Kogyo, Adeka Optomer N-1414) as a radical generating type photopolymerization initiator, 1.2 weight parts of an aminosilane coupling agent (N-β(aminoethyl)γ-aminopropyltrimethoxysilane, product of Shin-etsu Silicone, KBM-603) at 90° C. After the mixture was allowed to cool to room temperature, 5 weight parts of isophthalic dihydrazide (product name: IDH-S; jet mill pulverized grade by Otsuka Chemistry Inc. further finely pulverized with a jet mill; melting point: 224° C., active hydrogen equivalent: 48.5 g/eq; average particle diameter: 1.7 μm; maximum particle diameter: 7 μm), 30 weight parts of alumina (product of C.I. Kasei, Inc., SPC-Al, average particle diameter: 1.0 μm) and 7 weight parts of core shell rubber particles: paraloid EXL-2655 (product of Kureha Chemical Industry Co., Ltd., core layer: cross-linked polybutadiene, shell layer: alkyl methacrylate-styrene copolymer, average particle diameter: 200 nm) were added and blended with 3 rolls and the sealant for liquid crystals of the present invention was obtained. The viscosity (25° C.) of the sealant for liquid crystals was 200 Pa·s (R-type viscometer (product of Toki Sangyo Co., Ltd.)).

Experiment Example 2

Next, liquid crystal contaminating properties test (UV+heat), adhesion strength test and glass transition temperature measurement were conducted on the sealant for liquid crystals of Examples 1 and 2, and Comparative Examples 1 and 2.

Liquid Crystal Contaminating Properties Test (by UV+Heat)

The following measurement of the specific resistance in contacted liquid crystal was performed as an index of liquid crystal contaminating properties.

Into a sample tube, 0.1 g each of the sealants for liquid crystal was put, respectively, and 1 ml of a liquid crystal (product of Merck, MLC-6866-100) was added. After the mixture was irradiated with ultraviolet ray of 2000 mJ/cm$^2$ with UV irradiation equipment, it was placed in a 120° C. oven for 1 hour, and after that it was left at room temperature for 0.5 hour. After only the liquid crystal was taken out from the treated sample tubes, quantification of the ingredients which eluted to this liquid crystal was carried out by gas chromatography with pentadecane used as an internal standard. The results are shown in Table 2.

Adhesion Strength Test

As a spacer, 1 g of glass fiber (5 μm) was added to 100 g of the obtained sealant for liquid crystals, and the mixture was mixed and stirred. This sealant for liquid crystals is applied on a glass substrate of 50 mm×50 mm, and a piece of glass of 1.5 mm×1.5 mm was stuck on the sealant for liquid crystals, irradiated with ultraviolet ray of 2000 mJ/cm$^2$ with UV irradiation equipment, and then placed in a 120° C. oven for 1 hour to effect curing. The sheer strength of the piece of glass was measured. The results are shown in Table 2.

Glass Transition Temperature

The obtained sealant for liquid crystals sandwiched between polyethylene terephthalate (PET) films so that the sealant was made into a thin film having a thickness of 100 μm was irradiated with ultraviolet ray of 2000 mJ/cm$^2$ with UV irradiation equipment, and then placed in a 120° C. oven for 1 hour to effect curing. After the curing, PET films were removed and the cured sealant was used as a sample. The glass transition temperature was measured with TMA test machine (product of Shinku-Riko Inc.) in a tension mode. The results are shown in Table 2.

According to Table 2, good numerical values are similarly obtained in both Examples and Comparative Examples as for physical properties required for sealants such as adhesion strength and glass transition temperature. However, eluted substances to liquid crystal are much less in the sealants for liquid crystal of Examples 1 and 2 as compared with the sealants for liquid crystal of Comparative Examples 1 and 2. Therefore, it can be said that the sealants for liquid crystal of Examples 1 and 2 are sealants for liquid crystal which are very excellent in reliability of liquid crystal contaminating properties as compared with the sealants for liquid crystal of Comparative Examples 1 and 2.

and (c) an inorganic filler having an average particle diameter of 3 μm or less; and further comprising (d) an epoxy resin and (e) a heat-curing agent, wherein the epoxy resin (d) is an epoxy resin which does not elute into the liquid crystals in an amount of 0.05% by weight on the liquid crystals when the epoxy resin is brought directly into contact with the liquid crystals whose amounts is 10 times of the epoxy resin and is allowed to stand at 120° C. for 1 hour.

2. The sealant for liquid crystals according to claim 1, wherein the radiation curable resin (a) has a content of 30% by weight to 80% by weight based on the total amount of the sealant for liquid crystals.

3. The sealant for liquid crystals according to claims 1, wherein the radiation curable resin (a) has a viscosity of 30 to 500 Pa·s.

TABLE 2

|  | Example 1 | Example 2 | Comparative Example 1 | Comparative Example 2 |
|---|---|---|---|---|
| Viscosity (Pa · s) | 250 | 350 | 400 | 200 |
| Adhesion strength (MPa) | 70 | 75 | 75 | 75 |
| Glass Transition Temperature (° C.) | 100 | 100 | 90 | 85 |
| Liquid crystal contaminating test (120° C. × 1 hr.) Quantification of eluted substances (ppm) |  |  |  |  |
| Epoxy Acrylate A | 200 | 150 |  |  |
| Epoxy Acrylate B |  |  | 800 |  |
| Epoxy Acrylate C |  |  |  | 6500 |
| Bis S type epoxy | 250 | 200 | 250 |  |
| Total | 450 | 350 | 1050 | 6500 |
| Liquid crystal contaminating test (UV2J + 120° C. × 1 hr.) Quantification of eluted substances (ppm) |  |  |  |  |
| Epoxy Acrylate A | 100 | 80 |  |  |
| Epoxy Acrylate B |  |  | 480 |  |
| Epoxy Acrylate C |  |  |  | 1500 |
| Bis S type epoxy | 100 | 80 | 100 |  |
| Total | 200 | 160 | 580 | 1500 |

The invention claimed is:

1. A sealant for liquid crystals comprising as essential ingredients (a) a radiation curable resin represented by the general formula (2):

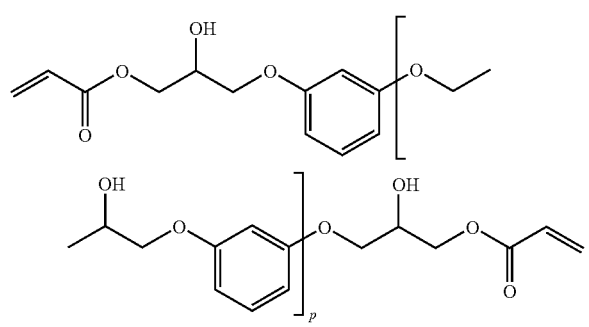

wherein the number p of the repeating units is a positive number in the range of 0 to 20, which is obtained by subjecting resorcin diglycidyl ether to acrylic acid in an amount equivalent to the number of epoxy groups in the molecule of diglycidyl ether; (b) a radical photopolymerization initiator;

4. The sealant for liquid crystals according to claim 1 wherein the radical type photopolymerization initiator (b) is a carbazole initiator.

5. The sealant for liquid crystals according to claim 1, wherein the heat-curing agent (e) is a dihydrazide.

6. The sealant for liquid crystals according to claim 5, wherein the dihydrazide is a dihydrazide having a skeleton of isophthalic dihydrazide and/or valine hydantoin.

7. The sealant for liquid crystals according to claim 1, wherein the heat-curing agent (e) is a polyhydric phenol.

8. The sealant for liquid crystals according to claim 1, further comprising (f) a silane coupling agent.

9. The sealant for liquid crystals according to claim 8, wherein the silane coupling agent is a silane coupling agent having an amino group.

10. A liquid crystal display cell which is sealed with a cured product of a sealant for liquid crystals according to claim 1.

11. A process for producing a liquid crystal display cell comprising dropping liquid crystals inside a sealant for liquid crystals according to claim 1 formed on a substrate and attaching another substrate thereto.

* * * * *